Figure 4:
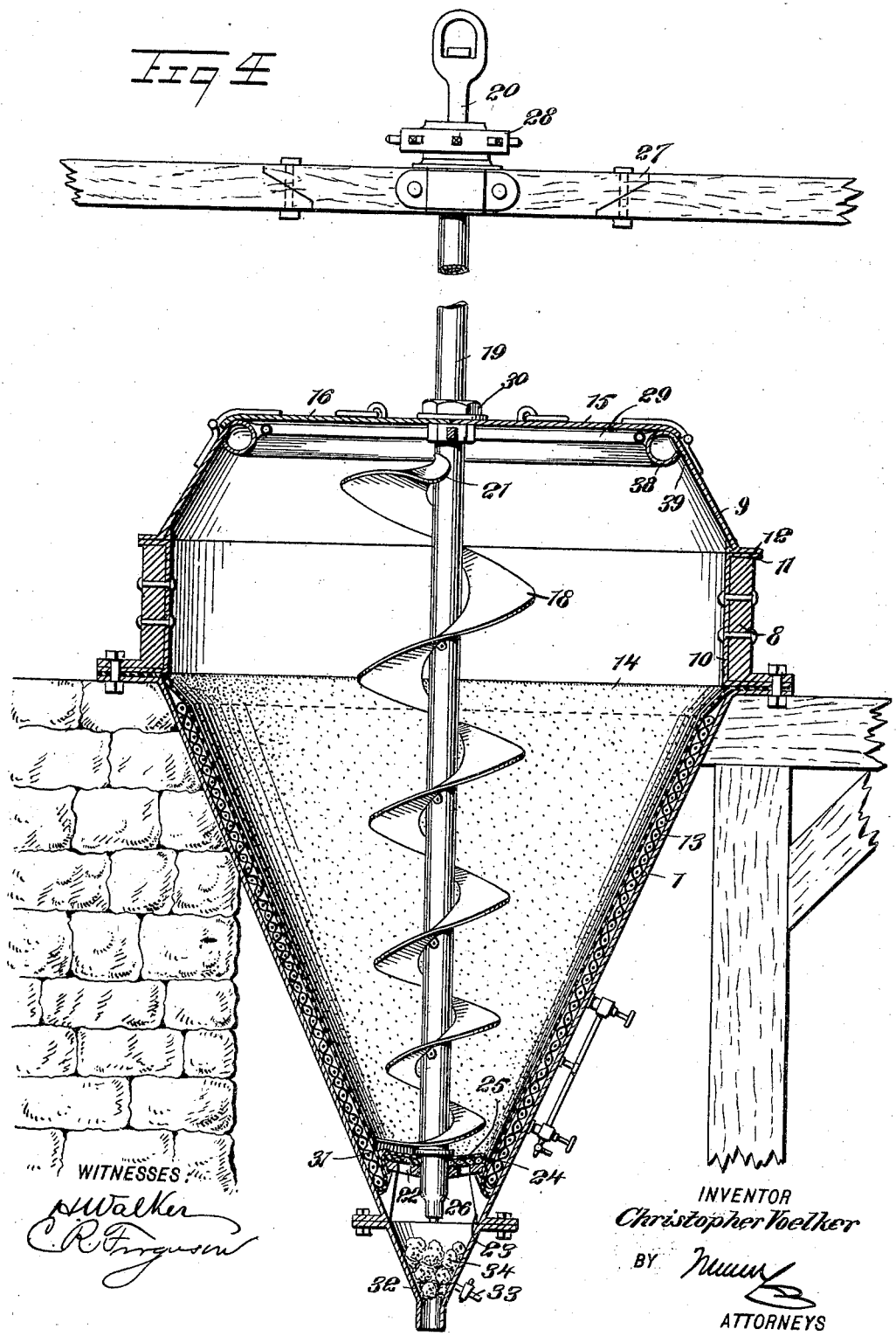

No. 684,654. Patented Oct. 15, 1901.
C. VOELKER.
ORE FILTER.
(Application filed Apr. 8, 1901.)
(No Model.) 3 Sheets—Sheet 1.
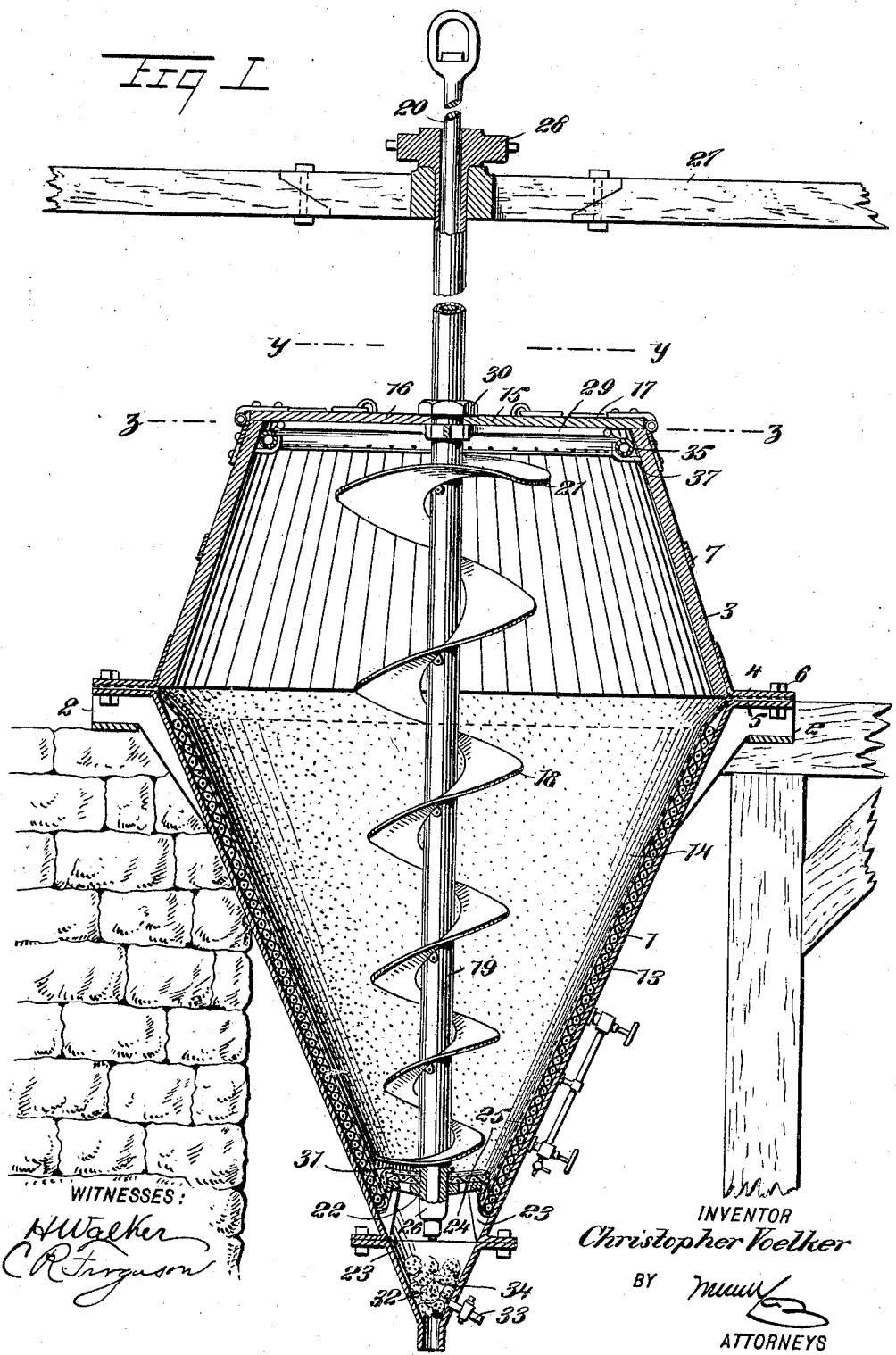
Fig. I.
WITNESSES:
INVENTOR
Christopher Voelker
BY
ATTORNEYS No. 684,654. Patented Oct. 15, 1901.
C. VOELKER.
ORE FILTER.
(Application filed Apr. 8, 1901.)
(No Model.) 3 Sheets—Sheet 2.
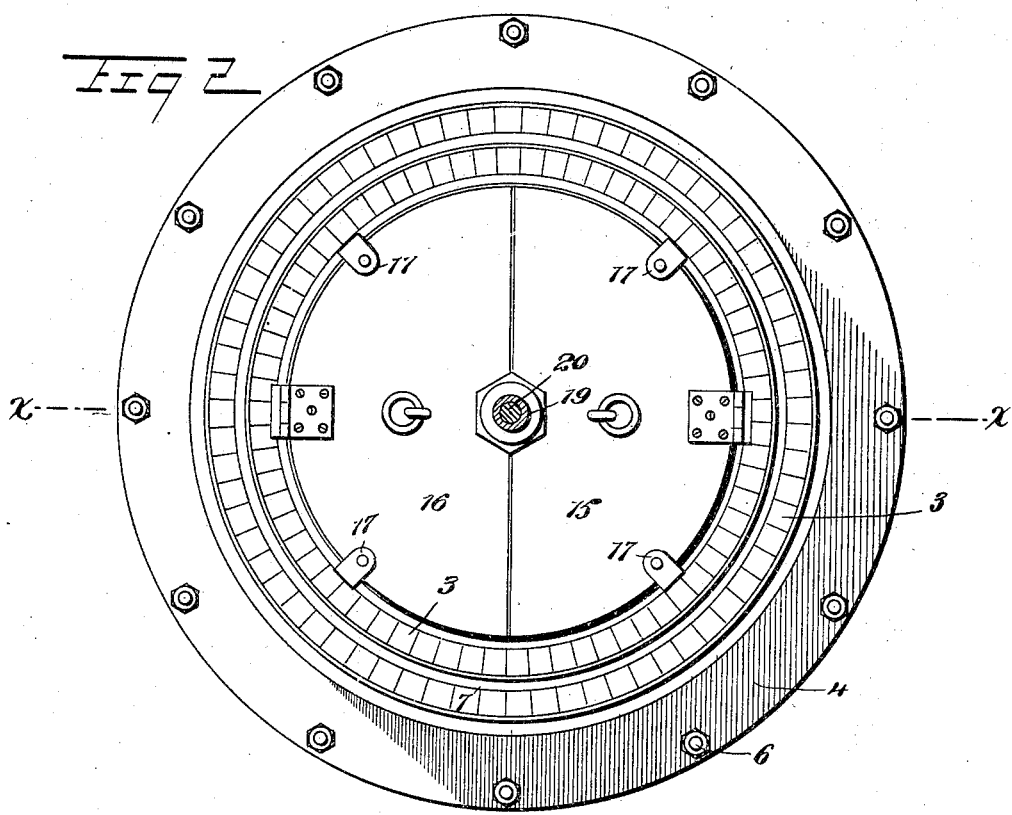
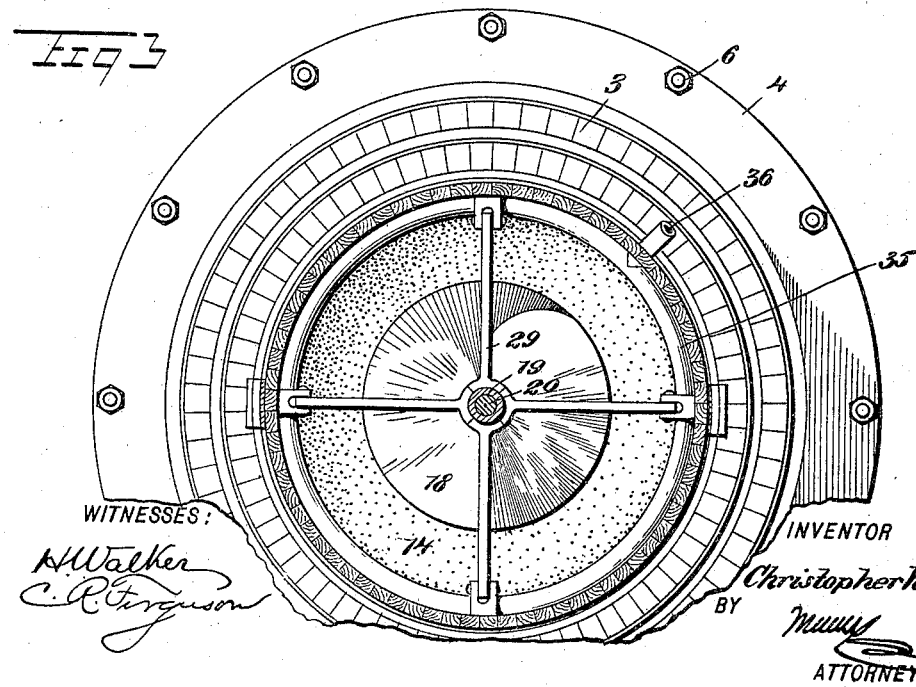

No. 684,654. Patented Oct. 15, 1901.
C. VOELKER.
ORE FILTER.
(Application filed Apr. 8, 1901.)
(No Model.)
3 Sheets—Sheet 3.

WITNESSES

INVENTOR
Christopher Voelker
BY
ATTORNEYS

THE NORRIS PETERS CO., PHOTO-LITHO., WASHINGTON, D. C.

UNITED STATES PATENT OFFICE.

CHRISTOPHER VOELKER, OF HELENA, MONTANA.

ORE-FILTER.

SPECIFICATION forming part of Letters Patent No. 684,654, dated October 15, 1901.

Application filed April 8, 1901. Serial No. 54,865. (No model.)

*To all whom it may concern:*

Be it known that I, CHRISTOPHER VOELKER, a citizen of the United States, and a resident of Helena, in the county of Lewis and Clarke and State of Montana, have invented a new and Improved Ore-Filter, of which the following is a full, clear, and exact description.

This invention relates to improvements in apparatus for recovering values from ores by filtration. The extraction of valuable metals from ores through the lixiviation processes, such as the cyanid and others, although allowing the advantageous working of low-grade ores still has one fault, that more or less metal remains in the tailings, and thus losses occur caused by the slimy particles contained in the pulverized ores generated from clay, talc, and other minerals which clog up the meshes of the filtering-cloth, and thus prevent the solution from going through freely. In such apparatus the ore is introduced and the solution added, and where it happens that the ore lies in different grades of value inside the tank the solution cannot dissolve the metalliferous particles in an even manner, and at the same time where it enters first it will affect the pulp more thoroughly, and as it goes down to the bottom will take the slimes forming with it, depositing them around the aperture through which the solution is drawn off and even several after-leachings will not remove them. To overcome these drawbacks, it is necessary to construct a mechanical apparatus which shall possess the condition of letting the soluble liquids needed to dissolve the metals go through the pulp in a space of time to be governed by the operator. Some ores are liable to contain chemical substances retarding the effectiveness of the soluble agent used and where it is of great import to remove them as quickly as possible to keep them from going into chemical action with the solution used.

The object of my invention, therefore, is to combine the above-mentioned conditions, and the apparatus can be used in addition to other milling plants to receive the tailings direct from the mill. The filtrate can be examined in regard to the valuable mineral matter which may exist, giving the metallurgist the means of saving the valuable salts of mercury, copper, silver, gold, and the like which may form through the chemical or electrical action in the amalgamators where such are used and where the extravagant use of copper sulfate, mercury, and salt is in most cases the cause of the solubility of gold, &c.

I will describe an ore-filter embodying my invention and then point out the novel features in the appended claims.

Reference is to be had to the accompanying drawings, forming a part of this specification, in which similar characters of reference indicate corresponding parts in all the figures.

Figure 1 is a sectional elevation of an ore-filtering apparatus embodying my invention, the section being on the line $x\ x$ of Fig. 2. Fig. 2 is a section on the line $y\ y$ of Fig. 1. Fig. 3 is a section on the line $z\ z$ of Fig. 1, and Fig. 4 is a vertical section showing a modification.

The apparatus comprises a funnel-shaped metal tank 1, supported in any suitable manner. I have here shown it as supported upon a framework and masonry by means of brackets 2. Removably connected to the tank is a top 3, which at its lower portion has an annular flange 4, secured to an annular flange 5 at the top of the tank 1 by means of bolts 6. In Fig. 1 this top or hood 3 is tapered upward and inward and consists of wood, which may be made of stave-like sections secured together by bands 7. In Fig. 4, however, the top or hood consists of two sections 8 and 9. The lower section 8 is secured directly to the flange of the tank and is made cylindrical or ring-shaped and has a metal lining 10, and the section 9 consists of metal inclined upward and inward, the parts being secured together by any suitable means—such, for instance, as by bolts passing through the engaging flanges 11 and 12. The tank is preferably given a slant of about fifty degrees, which will allow the slimes on the inner wall to slide down more easily than would a slant of sixty degrees or the like.

The filtering device consists of a conical basket 13, of wicker-work, which extends from the lower portion of the tank 1 to nearly the top thereof and fits closely against the inner surface. Stretched over this basket is a filtering material 14, consisting of canvas, jute, manila, or similar mesh material and which conforms to the shape and fits closely against the inner surface of the basket. It is held securely in place by having its lower end turned around the lower end of the wicker basket and its upper end turned outward and engaged between the flanges 4 and 5, as shown in Fig. 1, or between the flanges 11 and 12, as shown in Fig. 4. This will not only serve to hold the filtering material tightly in place, but the portion extended between the flanges will form a packing to prevent the escape of gas or the entrance of air.

Arranged on the top or hood is a covering consisting of two sections 15 and 16, these sections being suitably hinged to the hood or top and meeting at the middle when closed, and they may be held tightly in their closed position by any suitable means—such, for instance, as by clamps 17.

Arranged to operate in the apparatus is a screw 18. This screw is of great importance in the eventual sliming of ores. It is a tapered Archimedean screw wider at the upper end than at the bottom. This screw is secured to a tubular shaft 19, mounted to rotate on a rod 20. Each turn of the screw is substantially a shallow funnel, and the turns are slightly separated from the tubular shaft, as clearly indicated in the drawings, so as to permit the solutions to pass through. The upper turn of the screw is slightly turned down, as at 21. This serves to mix the pulp, carrying the same up through the center, allowing that part near the sides of the filter to slide down the steep slope of the funnel, eventually removing the slimes, and thus mixing the pulp evenly throughout. Should slimes gather on the screw during the leaching process, a turn or two of the screw will remove them, causing other particles of the pulp to take their place, and in this way the leaching will be more perfect.

A waste-gate 22 is removably arranged in the lower portion of the filter or at the lower end of the filtering material. This waste-gate is made in the form of a wheel or circular spider and is made sufficiently strong to resist the pressure of the ore-pulp on the screw. This gate 22 is supported on arms 23, arranged on the inner side of the tank. On the waste-gate a round web 24, of wickerwork, is placed to keep the filter-cloth 25, that covers the waste-gate, from bagging downward. Into the hub of the waste-gate is fixed a boxing 26, with or without ball-bearings, in which the lower end of the rod 20 extends. This boxing has a flange on its upper end that holds the central portion of the filtering-cloth 25 closely in position. The outer edge of said filter-cloth, it will be noted, is turned over the edge of the waste-gate and fastened.

The rod 20 may be secured in the boxing by any suitable means. For instance, its threaded end may be extended through the bottom of the boxing and a nut engaged therewith. This rod, with the tubular shaft, extends upward through a beam 27, and upon the said shaft is a pulley 28, with which a driving-belt may be engaged for imparting rotary motion to the screw. Secured in the hood or top at the upper end thereof is a spider 29, through which the tubular shaft has a bearing, and when the parts are in position and the cover-sections closed a nut or collar 30 on the shaft may be screwed down close to the cover.

The solution passes between the spokes of the waste-gate, and the slimes that form on or around the waste-gate filter are removed by means of a brush 31, attached to the under side of the lower portion of the screw, and this lower portion of the screw will act as a scoop to force the slimes upward through the pulp. To open the waste-gate, however, the center shaft, with attachments, is fixed in a raised position, when a few unscrewing motions are needed to lift the waste-gate up, and thus provide an aperture at the lower part of the apparatus through which the leached pulp may be washed out.

Attached to the lower end of the tank is a lower flow-regulator. This consists of a funnel 32, having a flange at its upper end adapted to be secured to the flange on the lower end of the tank, and the lower end of this lower flow-regulator can be connected with piping controlled by a valve to permit the solution to flow out at will. On one side is a small faucet 33, through which solution can be drawn off and examined. The funnel 32 is filled with sponge 34 or similar material. When necessary to clean the sponge, it is obvious that the funnel 32 can readily be detached.

In the upper portion of the device or in the top of the hood is a solution-supply pipe 35. This pipe 35 extends entirely around the upper portion of the hood and is connected to a tank for supplying solution or for supplying wash-water through a pipe 36. The pipe 35 has a line of perforations near the wall of the hood, a center line of perforations at the bottom, and a line of perforations at the inner side. This permits the solution or wash-water to saturate the pulp evenly and to cause it to come in contact with all parts of the pulp from the beginning. When the pipe is connected to a water-supply tank, it enables the operator to wash the waste pulp out by way of the waste-gate, as the small streams of water will start the pulp, which flows down the sides of the apparatus assisted by the screw, which is to be raised and fastened in any suitable manner. When the screw is operated in the opposite direction to that required for the treatment of ores, the pulp will be forced downward.

In Fig. 1 I have shown the solution-pipe as secured to the top or hood 3 by means of brackets 37. In Fig. 4, however, the pipe is formed by turning the upper edge of the section 9 of the hood or top inward, as at 38, leaving a space 39 for the discharge of liquid along the inner side of the hood.

The uses of the filtering apparatus are the various leaching processes, also chlorination or others where gases are to be introduced or generated in the same.

The working of the apparatus is very simple. After the different parts of the same are put in place and the flow-regulator closed the ore, after being ground to the desired fineness to suit the process, is introduced. It enters the filtering-tank from the top in such a manner that most of it will strike the edge of the screw, which will cause it to run down the same, and at the same time a slow revolution, about one turn to the minute, will help facilitate the filling of the tank. Where a preliminary wash is required, the wash-water is let on in a small stream by means of the solution-pipe, enough to moisten the pulp when the same is up within about the third lower screw-turn. Then more water is added in proportion as the ore enters the tank, the screw being slowly turned to help mix the pulp. By these means the lower parts of the ore-pulp get the benefit of the first washing, for the main benefit of a wash is that the pulp shall be freed of all deleterious substances, and this can only be accomplished by preventing the substances from concentrating in the lower parts of the leaching-vats, which generally result in having to use too much water and expenditure of time. The regular leaching or extracting fluid will then attack the metals to be dissolved more easily, and thus give better results in extraction.

Where the wash-waters can be dispensed with, the leaching solution is caused to act in the same manner as the wash on the ore-pulp, the same being kept from packing or stratifying by the screw loosening it. Tailings from a mill in operation are treated the same way, only the lower flow-regulator is opened when the pulp reaches the upper edge of the filter-cloth. This allows a quick drainage of the accompanying waters.

It depends all on the nature of the ore or tailings whether washed or one or two leachings are required. After-leachings can run through the pulp from the top to take the dissolved substances down, the screw being kept slightly in motion.

The wash-waters and leaching solutions leave the tank by way of the flow-regulator, whence they flow into different tanks provided for that purpose, the sponges in the flow-regulating attachment preventing the escape of fine slimes. When the fine slimes have accumulated in the sponges, they are taken out and the slimes removed. The saving of these fine slimes through this apparatus results in a profit to the operator, as these fine slimes usually run high in values. By thus saving these fine slimes they are prevented from escaping into the precipitating-boxes and retarding the process of precipitation.

After the leaching process is completed and the metals extracted from the pulp the lower flow-regulator is detached. The screw by reversed movements is caused to rise through the pulp, taking the waste-gate attached up with it, leaving an opening by which the pulp is removed.

Having thus described my invention, I claim as new and desire to secure by Letters Patent—

1. An ore-filter, comprising a funnel-shaped tank, a basket or filter-holder removably arranged in said tank and fitting closely against its inner wall, a filtering textile stretched over the inner surface of said basket, a top or hood for the tank, a shaft extended downward in the tank, and a screw mounted on said shaft and spaced at its inner edge therefrom, the said screw having the end of its upper turn turned downward, substantially as specified.

2. An ore-filter, comprising a funnel-shaped tank, a filtering device arranged therein, a waste-gate removably arranged in the lower portion of the tank, a filtering material on said waste-gate, a top or hood for the tank, a rod extended from said waste-gate upward through the top or hood, a hollow shaft mounted to rotate on said rod, and a screw attached to said hollow shaft within the tank, substantially as specified.

3. An ore-filter, comprising a funnel-shaped tank, a filtering device arranged in said tank, a top or hood for the tank, a waste-gate removably arranged in the lower portion of the tank, a rod connected at its lower end to said waste-gate and extended upward through the top, a shaft mounted to rotate on said rod, a filtering material arranged on the waste-gate, a screw in the tank, and a brush carried on the lower end of said screw for cleaning the said filtering material, substantially as specified.

4. An ore-filter, comprising a funnel-shaped tank, a filtering device arranged therein, a screw operating in the tank, and a flow-regulator consisting of spongy material, arranged in the lower portion of the tank, substantially as specified.

5. An ore-filter, comprising a funnel-shaped tank, a top or hood therefor, sectional covers for said top or hood, a filtering device arranged in the tank and conforming to the shape thereof, a shaft extended from the lower portion of the tank up through said cover, a screw mounted on the shaft, and a liquid-supply pipe surrounding the inner side of the top or hood, substantially as specified.

6. An ore-filter, comprising a funnel-shaped tank having an annular flange at its upper end, a top or hood having an annular flange at its lower end for engaging over the first-named flange, an open-work filter-holder arranged in the tank and conforming to the shape thereof, a filtering material engaging against the inner surface of said holder, the said filtering material having its lower end secured at the lower end of the holder and its upper end secured between said flanges, and a screw for operating in the tank, substantially as specified.

7. An ore-filter, comprising a funnel-shaped tank, a filtering device arranged therein and conforming to the interior shape thereof, a waste-gate arranged in the lower portion of the tank, a wicker-work support arranged on said waste-gate, a filtering material secured over said wicker-work support, a shaft extended upward from said gate, and a screw mounted on said shaft, substantially as specified.

8. An ore-filter, comprising a tank, a filtering device arranged therein and conforming to the shape thereof, a lower flow-regulator consisting of a receptacle attached to the lower end of the tank, sponge material arranged in said receptacle, and a screw for operating in the tank, substantially as specified.

9. In an ore-filter, a tank, a filtering device arranged therein, a shaft extended upward through said tank, an Archimedean screw arranged on said shaft, the circumference thereof gradually diminishing from the upper to the lower end, the inner edges of the turns being slightly separated or spaced from the shaft, and means for spraying solution onto the material in the tank, substantially as specified.

In testimony whereof I have signed my name to this specification in the presence of two subscribing witnesses.

CHRISTOPHER VOELKER.

Witnesses:
GEORGE F. DIBERT,
WALTER MATHESON.